Nov. 29, 1927.
H. L. BROWNBACK
INTERNAL COMBUSTION ENGINE
Filed Dec. 18, 1923
1,651,250
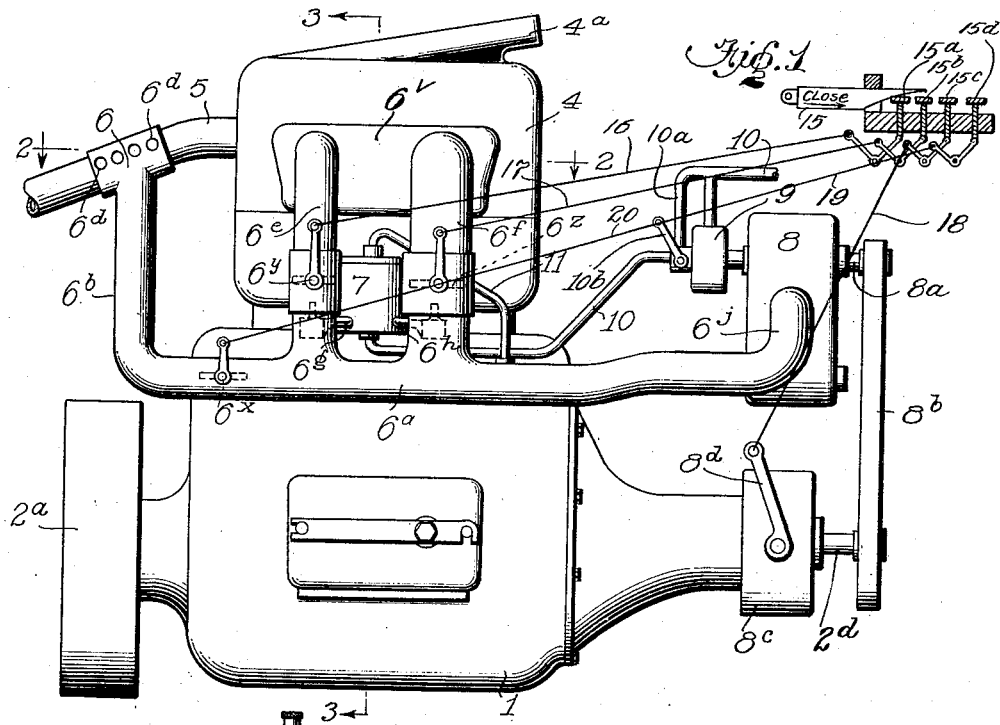
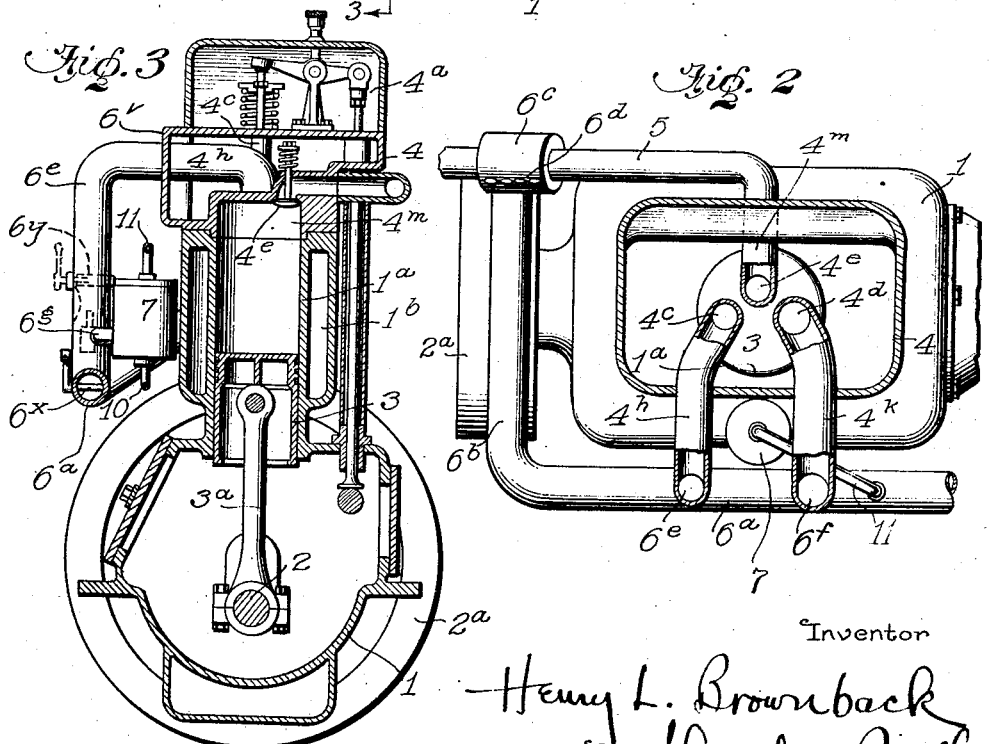
Inventor
Henry L. Brownback
By Alexander & Powell
Attorneys Patented Nov. 29, 1927.

1,651,250

UNITED STATES PATENT OFFICE.

HENRY LOWE BROWNBACK, OF NORRISTOWN, PENNSYLVANIA.

INTERNAL-COMBUSTION ENGINE.

Application filed December 18, 1923. Serial No. 681,425.

This invention relates to internal combustion engines, and the principal object thereof is to provide a 4-cycle internal combustion engine which is substantially a high and low speed engine combined in one working cylinder, and designed to obtain maximum efficiency regardless of the speed of its operation.

Heretofore all attempts to get maximum efficiency, regardless of speed of operation, have been merely compromises, but in my novel design no compromises are contemplated, the engine being substantially a combination of two radically different engines, one a low speed engine and the other a high speed engine combined in one working cylinder.

The engine consists of one or more cylinder units, each unit being of the four-cycle type, and each cylinder being fitted with one or more exhaust valves, preferably one, and one or more inlet valves, preferably two, one of the inlet valves with its manifolds, etc., being dimensioned and timed to obtain maximum efficiency of the engine operating therethrough at low speeds, said valve being connected to the carburetor, or other fuel supply, which is preferably fitted with a suitable heating apparatus to prevent condensation of the fuel gases and to give the greatest possible efficiency to the engine at low speeds, so that the engine, operating through this low speed valve, will be a low speed engine of the greatest efficiency. The other inlet valve, with its manifolds, etc., is likewise dimensioned and timed, to act separately or in conjunction with the low speed valve, to give the utmost power and efficiency attainable from the engine at high speeds, and to attain the greatest economy at such high speeds.

In practice a partial opening of the main engine throttle will open the passage from the carburetor to the low speed valve until the maximum efficient speed is attained by the engine operating through said valve. On a further opening of the main engine throttle the passage to the high speed valve will open which valve is timed and dimensioned either separately or in conjunction with the low speed valve to obtain maximum efficiency at high engine speeds.

In this manner of construction and operation an engine which is docile, and which will have all the characteristics of a low speed engine, will, upon sufficient opening of the throttle, have the characteristics of a high speed, high powered, multiple valve engine.

Another object is to provide a novel supercharger connected to the carburetors feeding the passages to both the inlet valves, with suitable control means for said supercharger connected to the main engine control, or to a governor mechanism or a combination of both for bringing said supercharger into action at a predetermined position of the engine control.

Other minor objects of the invention will be hereinafter set forth.

I will explain the invention with reference to the accompanying drawing which illustrates one practicable embodiment thereof, to enable others to adopt and use the same, and will summarize in the claims the essential features of the invention, the novel combinations of parts, and novel features of construction, for which protection is desired.

In the drawings:

Fig. 1 is a side elevation of my novel engine showing the arrangement of manifolds, throttles, supercharger, etc.

Fig. 2 is a horizontal section on the line 2—2, Fig. 1.

Fig. 3 is a transverse vertical section through the engine on the line 3—3, Fig. 1.

As shown in the drawings, the engine comprises a base 1 provided with suitable bearings for the crank shaft 2 which carries the usual fly wheel $2^a$. In the upper end of the base 1 is one (or more) cylinder bores $1^a$, each bore $1^a$ being adapted to receive a piston 3 which is reciprocably mounted therein, the upper end of the cylinder bore $1^a$ above the top of piston 3 forming the working chamber of the engine.

If desired, each cylinder bore $1^a$ may be provided with water cooling ducts $1^b$ in the usual manner, and piston 3 may be connected to the crank shaft 2 by means of the usual connecting rod $3^a$.

Upon the top of casting 1, is detachably mounted a cylinder head 4 adapted to close the top of each working chamber, said head 4 being provided with three or more valves as hereinafter described, and if desired a water cooling duct $4^a$ may be provided around said valves.

In cylinder head 4 are two inlet valves $4^c$, and $4^d$, for each cylinder, inlet valve $4^c$ being timed and designed for operating the engine most efficiently at low engine speeds, and inlet valve 4$^d$ being timed and designed for operating the engine most efficiently at high engine speeds. Also, an exhaust valve 4$^e$ for each working chamber is provided in head 4, said valves 4$^e$, 4$^d$ and 4$^e$ being actuated by suitable valve actuating mechanism of any desired form and in any desired manner.

Intake valve 4$^e$ communicates with a duct 4$^h$ leading to the exterior of one side of the head 4; also intake valve 4$^d$ communicates with a duct 4$^k$ leading to the exterior of head 4 on the same side of head 4 as duct 4$^h$; and exhaust valve 4$^e$ communicates with a duct 4$^m$ leading to the opposite side of the head 4.

An exhaust manifold 5 is provided, with openings respectively registering with the exhaust ducts 4$^m$, said manifold 5 discharging either into the atmosphere, or into a suitable muffler (not shown), in the usual manner.

On the opposite side of the engine from the exhaust manifold 5 is an intake manifold 6, as shown in Fig. 1, said manifold having a horizontally disposed branch 6$^a$, which branch is preferably tubular as shown in Fig. 3, but may be of any desired form or cross section. One end 6$^b$ of branch 6$^a$ is bent substantially at right angles to said branch as shown, and the outer end of part 6$^b$ is connected with a perforated jacket 6$^c$ around the exhaust manifold 5, jacket 6$^c$ being of greater diameter than the exhaust manifold 5. Suitable openings 6$^d$ are provided in the jacket 6$^c$ to permit air to pass from the atmosphere into jacket 6$^c$ adjacent the exhaust manifold 5.

Extending upwardly from, and communicating with the branch 6$^a$, are two vertical branches 6$^e$, 6$^f$, connecting with the intake ducts 4$^h$, 4$^k$ respectively, the upper ends of said branches 6$^e$, 6$^f$, being connected together by means of a bracket 6$^g$, which may be attached in any desired manner to the side of the cylinder casting 1, so as to connect the upper ends of the members 6$^e$, 6$^f$, with their respective intake ducts.

A carburetor 7 may be mounted in any desired manner between the branches 6$^e$ and 6$^f$, and suitable ducts 6$^g$ and 6$^h$, are provided to connect the carburetor nozzles in the branches 6$^e$, 6$^f$, respectively with the carburetor 7.

The opposite end of branch 6$^a$ is preferably extended as shown, and is bent as at 6$^j$, and communicates with the air outlet mouth of a suitable rotary air blower, or supercharger 8 which supercharger is preferably supported by the part 6$^j$ of branch 6$^a$.

Blower 8 is preferably a rotary blower but may be of any other type, and the shaft 8$^a$ of said blower or supercharger is preferably driven from an extension 2$^d$ of the crank shaft 2, by means of a belt 8$^b$ running over suitable pulleys on said shafts 8$^a$ and 2$^a$. A suitable clutch 8$^c$ is provided to cause extension 2$^d$ to be driven by shaft 2, or to remain idle, said clutch 8$^c$ being operated by means of a clutch lever 8$^d$ as shown in Fig. 1.

Mounted on one end of blower shaft 8$^a$ is a small fuel impeller pump 9 which is driven by and with blower shaft 8$^a$, said pump 9 being interposed in a fuel pipe 10 leading from the source of fuel supply and discharging into the carburetor 7 in the usual manner. A by-pass 10$^a$ is provided around the pump 9, which by-pass is controlled by a suitable valve 10$^b$ so that when the valve is open, and the pump inoperative the fuel will be lead unobstructed to the carburetor 7 without passing through the pump 9, but when said valve 10$^b$ is closed and the pump operating the fuel will be diverted through said pump and will be impelled by the force of said pump into the carburetor 7.

An equalizer pipe 11 is provided connecting the branch 6$^a$, adjacent the blower 8, with the upper part of the float chamber of the carburetor 7, so that when the air pressure is increased at the air inlet mouth of the carburetor, air under the same pressure will also be directed through pipe 11 above the float in the carburetor float chamber, to equalize the air pressures in said chamber so as not to interfere with the normal feeding of fuel vapors through the carburetor.

Suitable valves are provided in the manifold 6 as follows: A valve 6$^x$ is provided in the branch 6$^a$ adjacent the bend 6$^b$, said valve 6$^x$ being operated by means of a suitable lever, as shown. A throttle valve 6$^y$ is provided in the vertical low speed branch 6$^e$, above the duct 6$^g$, and a throttle valve 6$^z$ is provided in the high speed 6$^f$, above the duct 6$^h$, and said valves may be operated as diagrammatically shown in Fig. 1, in which a block 15 is reciprocably mounted on a fixed support, and controlled by the main engine throttle (not shown). As block 15 is moved inwardly it first depresses button 15$^a$ which opens valve 6$^y$ by means of rod 16 acting through a bell-crank; as block 15 is further moved inwardly it similarly, and successively, depresses button 15$^b$ operating rod 17 and opening valve 6$^z$; then depresses button 15$^c$ operating rod 18 and throwing clutch lever 8$^d$ to operate the supercharger 8; and depresses button 15$^d$ operating the by-pass valve 10$^b$ and heater valve 6$^x$. During the inward motion each button is pushed down and held down in proper succession. Other means for operating the valves may be used however.

The operation of the engine is as follows:
As the engine starts from standstill the valve 6$^x$ is opened allowing heated air from the stove 6$^c$ around the exhaust pipe 5 to be drawn into the branch 6$^a$, and into the air inlet mouth of the carburetor 7 to heat the fuel vapors passing into the working chamber. Low speed valve 6ʸ preferably controlled by the main engine throttle through suitable link mechanism in branch 6ᵃ then opens gradually allowing the heated fuel vapors to pass into the working chamber through the open inlet valve 4ᶜ. Valve 6ʸ continues to open until said valve reaches its maximum open position and until the engine is operating most efficiently through said valve 6ʸ as a low speed engine.

As the speed of the engine increases and the main throttle valve is further opened high speed throttle valve 6ˣ then starts to open allowing heated fuel vapors to pass from the carburetor 7 into the working chamber through open inlet valve 4ᵈ, hence allowing fuel vapors to be supplied to the working cylinder through inlet valve 4ᵈ or through both inlet valves 4ᶜ, 4ᵈ. When both valves 6ʸ, 6ˣ have reached their maximum open position, and the engine is operating most efficiently through said valves as a high speed engine clutch 8ᶜ is actuated to bring the supercharger 8 into action to supply supercharging air, under pressure, to the branch 6ᵃ, said clutch 8ᶜ being actuated either by means of a control linked to the main engine throttle, or by a governor mechanism, or by a combination of both, and if desired the pressure in the supercharger 8 may be governed either by a mechanism allowing clutch 8ᶜ to bring it into action, or by a pressure release to the atmosphere, or both. As the supercharger shaft 8ᵃ is rotated, the air pressure within the manifold 6 is gradually increased therein and at the mouth of the carburetor 7, until the full pressure of the supercharger is used. As the pressure in member 6ᵃ is built-up by the supercharger 8, the valve 6ˣ should correspondingly close until valve 6ˣ is entirely closed, at which time the air in the manifold, is supplied solely through the supercharger 8, and the supply of heated air is cut off.

When the supercharger is in action, air from the supercharger 8 or branch 6ᵃ is conducted through pipe 11 to the upper part of the float chamber of the carburetor 7, so as to equalize the pressure on both sides of the carburetor float, when the supercharger is forcing air under pressure into the mouth of the carburetor, thus allowing the carburetor to function properly during supercharging without interfering with the normal feeding of fuel vapors therethrough.

Also, when the supercharger is in action the fuel impeller pump 9 will also be actuated and valve 10ᵇ will be closed to direct the fuel passing to the carburetor through said pump 9, thereby boosting the pressure of the fuel entering the carburetor in exact proportion to the increase in pressure of the supercharging air above the fuel in the carburetor.

If desired, the supercharger 8 could be omitted, in which case the engine would have two high efficiency points, one when the fuel vapors are being fed to the working cylinder through the low speed valve and passage, operating the engine therethrough as a low speed engine, if both the inlet valves and passages are used, and the other high efficiency point being reached when both the low and high speed ducts are open to operate the engine as a high speed engine.

When the supercharger is used however the engine will have three high-efficiency points, one when the low speed valve is operating, the second when the low and high speed valves are open to give full normal volumetric efficiency; and the third when the supercharger is in action supercharging the fuel vapors passing to the working chamber.

When the supercharger is used it is necessary that the gas be led through the nozzles of the carburetor 7 at the same proportionate rate as when same is not used, which necessitates the use of tube 11 leading from the supercharger to the float chamber of the carburetor, tube 11 tending to keep the pressure in the float chamber synchronized with the pressure at the mouth of the carburetor. The use of the supercharger further necessitates feeding the fuel to the carburetor under increased pressure. At normal pressure when the supercharger is not used the fuel is passed through the by-pass 10ᵃ around the impeller pump 9, which pump 9 is only in action when the supercharger 8 is running, and which by-pass 10ᵃ is closed by valve 10ᵇ. As the pressure at the mouth of the carburetor is raised by the supercharger 8 the increase in fuel pressure at the carburetor float is raised in proportion to the increase in air pressure at the mouth of the carburetor and in the float chamber by the fuel impeller pump 9.

At low speeds it is important to heat the fuel vapors to keep same vaporized and to prevent condensation but at high speeds the heat is detrimental as it expands the fuel vapors prior to their entry into the working cylinder, and makes the fuel vapors lighter per volume than if the vapors were cold. Various devices, such as thermally controlled hot-air by-passes, etc. have been heretofore used to heat the fuel vapors at low speeds, and to give but little heat to said vapors at high speeds. In my novel engine however I provide sufficient heat for the vapors at low speeds and none on high speeds. When the engine is running without the supercharger, the air is drawn into the branch 6ᵃ from the stove making the low speed sides "hot spotted". When the supercharger is brought into action however its drives cold air out through the part 6ᵇ, until the valve 6ˣ is closed, and the pressure at the mouth of the carburetor 7 is at its maximum. Thus cold vapors are conducted into the working chamber of the engine as soon as the supercharger comes into action.

If desired, only one inlet valve to the working chamber could be used in place of the two inlet valves shown in the drawings though it is preferable to provide two independent inlet valves each valve being timed and dimensioned to cause the engine to operate therethrough respectively with maximum efficiency at low or high speeds.

I do not limit my invention to the exact engine shown in the drawings, for obviously the parts of said engine could be greatly modified without departing from the scope of the invention.

I claim:—

1. An internal combustion engine comprising a working chamber; a low speed intake valve; a high speed intake valve; an intake manifold having a plurality of ducts; ducts leading from the carburetor to the high and low speed intake valves respectively; a throttle in said low speed manifold duct; a throttle in said high speed manifold duct; a third duct conducting air into said high and low speed manifold ducts respectively; said low speed intake valve and duct being timed and dimensioned to give maximum efficiency to the engine operating therethrough at low engine speeds, and said high speed intake valve and duct being timed and dimensioned to give maximum efficiency to said engine operating therethrough at high engine speeds; means automatically opening the low speed throttle at low engine speeds, and for automatically opening both the low and the high speed throttles after the engine has obtained its maximum efficient speed when operating through the low speed intake valve, whereby the engine will have the characteristics of an efficient low speed engine at low speeds, and the characteristics of an efficient high speed engine at high speeds.

2. An internal combustion engine comprising a working chamber; an exhaust valve; an exhaust manifold communicating with said valve; a low speed intake valve; a high speed intake valve; an intake manifold having a plurality of ducts; ducts leading from the intake manifold to the high and low speed intake valves respectively; a throttle in said low speed duct; a throttle in said high speed duct; a hot air heater; a third manifold duct conducting heated air from said heater into said high and low speed manifold ducts respectively; said low speed intake valve and duct being timed and dimensioned to give maximum efficiency to the engine operating therethrough at low engine speeds, and said high speed intake valve and duct being timed and dimensioned to give maximum efficiency to said engine operating therethrough at high engine speeds; means connected with the main engine throttle for automatically opening the low speed throttle at low engine speeds, and for automatically opening both the low and the high speed throttles after the engine has obtained its maximum efficient speed when operating through the low speed intake valve, whereby the engine will have the characteristics of an efficient low speed engine at low speeds, and the characteristics of an efficient high speed engine at high speeds.

3. In combination with an engine as set forth in claim 2, said hot air heater comprising a perforated jacket around said exhaust manifold, and a pipe connection between said jacket and third manifold duct, whereby the air passing through said perforations into the jacket will be heated and conducted into the said third duct; a valve in said pipe connection; and means for automatically closing said valve at high engine speeds.

4. A 4-cycle internal combustion engine comprising a working chamber; an exhaust valve; an exhaust manifold communicating with said valve; a low speed intake valve; a high speed intake valve; an intake manifold having a plurality of ducts; ducts leading from the carburetor to the high and low speed intake valves respectively; a throttle in said low speed duct; a throttle in said high speed duct; a perforated hot air jacket around said exhaust manifold; a third manifold duct conducting heated air from said jacket and discharging into said high and low speed manifold ducts respectively; said low speed intake valve and duct being timed and dimensioned, in conjunction with the low speed valve and duct to give maximum efficiency to said engine operating through said valves at high engine speeds; and means operated by the main engine control for first automatically opening the low speed throttle at low engine speeds, and for automatically opening both said low and high speed throttles after the engine has obtained its maximum efficient speed when operating through said low speed intake valve, whereby the engine will have the characteristics of an efficient low speed engine at low speeds, and the characteristics of an efficient high speed engine at high speeds.

5. An internal combustion engine comprising a working chamber; a low speed intake valve; a high speed intake valve; an intake manifold having a plurality of ducts; a manifold duct leading from the carburetor to the low speed valve; a second manifold duct leading from the carburetor to the high speed valve; a throttle in said low speed duct; a throttle in the high speed duct; a third manifold duct communicating respectively with the high and low speed manifold ducts; means for supplying air at atmospheric pressure to said third duct; means for supplying supercharging compressed air to said third duct at a predetermined speed; means connected to the main engine control for first automatically opening the low speed throttle at low engine speeds, and for automatically opening both the low and high speed throttles at intermediate engine speeds, and for automatically actuating the supercharging means to supply air above atmospheric pressure into said third duct at high speeds of the engine.

6. In combination with an engine as set forth in claim 5, said means for automatically supplying supercharging air under gradually increasing pressure to said third duct, comprising a rotary blower discharging air under pressure into said third duct, means for driving said blower shaft, and clutch means for automatically actuating said driving means, at a predetermined speed of the engine.

7. An internal combustion engine comprising a working chamber; an exhaust valve; a low speed intake valve; a high speed intake valve; an exhaust manifold communicating with said exhaust valve; an intake manifold having a plurality of ducts; a manifold duct connecting the carburetor with the low speed valve; a second manifold duct connecting the carburetor with the high speed valve; a throttle in said low speed duct; a throttle in said high speed duct; a third manifold duct communicating with the lower ends of said high and low speed ducts; means for supplying heated air to said third duct; means for supplying supercharging air at normal temperature to said third duct; means for automatically cutting off the supply of heated air to said third duct when compressed air is admitted thereto; means connected with the main engine control for automatically first opening said low speed throttle at low engine speeds to permit heated fuel vapors to pass into the working chamber, and for automatically opening both said high and low speed valves at intermediate engine speeds to permit heated fuel vapors to pass through said valves into said working chamber, and for automatically actuating said supercharging means to supply supercharged fuel vapors to the working chamber through said valves at high engine speeds; and means for maintaining the pressure of the fuel supply to the carburetor in proportion to the pressure of said supercharging air in the third duct.

8. In combination with an engine as set forth in claim 7, said means for automatically supplying supercharging air to said third duct comprising a rotary blower discharging air under pressure into said third duct, means for driving said blower shaft from the engine shaft, and clutch means for automatically actuating said driving means at a predetermined speed of the engine.

9. In combination with an engine as set forth in claim 7, said means for maintaining the pressure of the fuel supply to the carburetor in proportion with the pressure of the supercharging air in said third duct, comprising a rotary pump interposed in the fuel supply pipe, means for driving said pump by and with said means for supplying supercharging air to said third duct; a by-pass in said fuel pipe around said pump; and a valve in said by-pass, whereby when the pump is inoperative said valve will permit the fuel to pass unobstructed to the carburetor, but when the pump is operating said fuel will be directed therethrough.

10. In combination with an engine as set forth in claim 7, said means for supplying heated air to said third duct comprising a perforated jacket around said exhaust manifold, and a pipe connection between said jacket and third duct, whereby air from the atmosphere passing through said perforations and into said perforated jacket will be heated by contact with said exhaust manifold and will be passed into the third duct.

11. A 4-cycle internal combustion engine comprising a working chamber; an exhaust valve; an exhaust manifold communicating with said exhaust valve; a low speed intake valve; said valve being timed and dimensioned to operate the engine most efficiently at low speeds; a high speed intake valve, said valve being timed and dimensioned to operate the engine most efficiently at high speeds; an intake manifold having a plurality of ducts; a manifold duct connecting the carburetor with the low speed valve; a second manifold duct connecting the carburetor to the high speed valve; a throttle in said low speed duct; a throttle in said high speed duct; a third manifold duct connecting the lower ends of said low and high speed manifold ducts; means for supplying heated air to said third duct; means for supplying supercharging compressed air to said third duct; a damper in said third duct; means whereby when said supercharging compressed air is forced into said third duct said damper will automatically close to cut off the supply of heated air; means for maintaining the pressure of the fuel supply to the carburetor in proportion to the pressure of the supercharging air in said third duct; means for equalizing the pressure in the carburetor float chamber when the compressed air is supplied to the third duct; and means connected to the main engine throttle, whereby on a partial opening of said throttle the low speed throttle will be opened, and whereby on a further opening of said throttle the high speed throttle will be opened; and whereby on a still further opening of said throttle said supercharging means will be actuated to supply compressed air to third duct and carburetor to supercharge the fuel vapors passing through said valves into the working chamber.

12. In combination with an engine as set forth in claim 11, said means for automatically supplying supercharging air to said third duct comprising a rotary blower discharging compressed air into said third duct, means for driving said blower shaft from the engine crank shaft, and clutch means for automatically actuating said driving means at a predetermined speed of the engine.

13. In combination with an engine as set forth in claim 11, said means for maintaining the pressure of the fuel supply to the carburetor in proportion with the pressure of the supercharging air in said third duct, comprising a rotary pump interposed in the fuel supply pipe, means for driving said pump by and with said means for supplying supercharging compressed air to said third duct; a by-pass in said fuel pipe around said pump; and a valve in said by-pass, whereby when the pump is inoperative said valve will permit said fuel to pass unobstructed to the carburetor, but when the pump is operating the fuel will be directed therethrough.

14. In combination with an engine as set forth in claim 11, said means for supplying heated air to said third duct comprising a perforated jacket around said exhaust manifold, and a pipe connecting said jacket and third duct, whereby air from the atmosphere passing into said perforated jacket will be heated by contact with said exhaust manifold, and will be conducted into the third duct.

15. In combination with an engine as set forth in claim 11, said means for equalizing the pressure in the carburetor float chamber, comprising a passage leading from said third duct and discharging above the float in the carburetor float chamber, whereby the air pressure on both sides of said carburetor float will be equalized when compressed air is supplied to said third duct.

16. An internal combustion engine comprising a working chamber; a low speed intake valve; a high speed intake valve; an intake manifold having a plurality of ducts; ducts leading from the carburetor to the high and low speed intake valves respectively; a throttle in said low speed duct; a throttle in said high speed duct, a third duct conducting air into said high and low speed duct respectively, said low speed intake valve and duct being timed and dimensioned to give maximum efficiency to the engine at low engine speeds; said high speed intake valve and duct being timed and dimensioned to give maximum efficiency to said engine at high engine speeds; means for opening the low speed throttle at low engine speeds, and means for automatically opening the high speed throttle after the engine has obtained its maximum efficient speed when operating through the low speed throttle, whereby the engine will be an efficient low speed engine at low speeds, and an efficient high speed engine at high speeds.

17. In an internal combustion engine as set forth in claim 16, means for augmenting the efficiency of the engine by supercharging and means for feeding fuel to the carburetor under pressure while supercharging.

18. In an engine as set forth in claim 16, means for augmenting the efficiency of the engine by supercharging, said means comprising an air blower or pump; and a fuel pump, and means for operating said blower and pump at a predetermined speed of the engine.

19. In an engine as set forth in claim 16, means for augmenting the efficiency of the engine, comprising a rotary pump interposed in the fuel supply pipe, means for driving said pump, an air pump or blower; a by-pass in said fuel pipe around the fuel pump; and a valve in said by-pass; whereby when the pump is inoperative said valve will permit the fuel to pass unobstructed to the carburetor, but when the pump is operating the fuel will be directed therethrough.

20. In an internal combustion engine a working chamber; an exhaust manifold, an exhaust valve; a low speed intake valve; a high speed intake valve; an intake manifold having a plurality of ducts; ducts leading from the intake manifold to the high and low speed intake valves respectively; a throttle in said low speed duct; a throttle in said high speed duct; an air heater, a third duct conducting heated air from said heater into said intake manifold; said low speed intake valve and duct being timed and dimensioned to give maximum efficiency to the engine at low engine speeds, and said high speed intake valve and duct being timed and dimensioned to give maximum efficiency to said engine at high engine speeds; means for opening the low speed throttle at low engine speeds, and for automatically opening the high speed throttle after the engine has obtained its maximum efficient speed when operating through the low speed throttle, whereby the engine will have the characteristics of an efficient low speed engine at low speeds and operate as an efficient high speed engine at high speeds.

21. In an internal combustion engine as set forth in claim 20, means for augmenting the efficiency of the engine by progressively supercharging, and means for feeding fuel to the carburetor under pressure proportionate to the supercharging pressure.

22. In an engine as set forth in claim 20, said means for augmenting the efficiency of the engine by supercharging, said means comprising an air blower or pump; and a fuel pump, and means for operating said blower and pump at a predetermined speed of the engine.

23. In an engine as set forth in claim 20, means for augmenting the efficiency of the engine comprising a rotary pump interposed in the fuel supply pipe, means for driving said pump, an air pump or blower; a by-pass in said fuel pipe around the fuel pump; and a valve in said by-pass, whereby when the pump is inoperative said valve will permit the fuel to pass unobstructed to the carburetor, but when the pump is operating the fuel will be directed therethrough.

24. In combination with an internal combustion engine, a carburetor; a supercharger; means for automatically driving the supercharger at a predetermined opening of the engine throttle; and means driven by the supercharger for feeding fuel to the carburetor under pressure while supercharging.

25. In combination with an internal combustion engine, a carburetor; a supercharger; means for automatically driving the supercharger at a predetermined opening of the engine throttle; means for feeding fuel to the carburetor under pressure while supercharging; and means for equalizing the pressure in the carburetor float chamber with the supercharging pressure during the supercharging operations.

26. In combination with an internal combustion engine, a carburetor; a supercharger; means for automatically driving the supercharger at a predetermined opening of the engine throttle; and a fuel feed pump driven by the supercharger whereby the pressure of the fuel feed will be proportional to the supercharging pressure.

27. In combination with an internal combustion engine, a carburetor; a supercharger; means for automatically driving the supercharger to progressively supercharge at a predetermined opening of the engine throttle; a fuel feed pump driven by the supercharger; and means for equalizing the pressure in the carburetor float chamber with the supercharging pressure during the supercharging operation.

28. In combination with an internal combustion engine, a carburetor; a supercharger; means for automatically driving the supercharger to progressively supercharge at a predetermined opening of the engine throttle; a fuel feed pump driven by the supercharger; a by-pass around said pump; a normally open valve in said by-pass and means for closing said valve when the supercharger is actuating.

29. In an internal combustion engine, a working chamber; a low speed intake valve; a high speed intake valve; a carburetor; a duct connecting the carburetor with the low speed valve; a second duct connecting the carburetor with the high speed valve; a supercharger; means for admitting fuel vapors to the working chamber at low engine speeds through the low speed valve and duct, and for admitting fuel vapors to the working chamber through both the low and high speed valves and ducts at intermediate engine speeds; means for supercharging the fuel vapors passing through said ducts at high engine speeds; and means for feeding fuel to the carburetor under pressure while supercharging.

30. In an internal combustion engine, a working chamber; a low speed intake valve; a high speed intake valve; a carburetor; a duct connecting the carburetor with the low speed valve; a second duct connecting the carburetor with the high speed valve; a supercharger; means for admitting fuel vapors to the working chamber at low engine speeds through the low speed valve and duct, and for admitting fuel vapors to the working chamber through both the low and high speed valves and ducts at intermediate engine speeds; means for progressively supercharging the fuel vapors passing through said ducts at high engine speed; and means for maintaining the pressure of the fuel supply to the carburetor proportionate to the supercharging pressure.

31. In an internal combustion engine, a working chamber; a low speed intake valve; a high speed intake valve; a carburetor; a duct connecting the carburetor with the low speed valve; a second duct connecting the carburetor with the high speed valve; a supercharger; means for automatically admitting fuel vapors to the working chamber at low engine speeds through the low speed valve and duct, and for automatically admitting fuel vapors to the working chamber through both the low and high speed valves and ducts at intermediate engine speeds; means for automatically supercharging the fuel vapors passing through said ducts at high engine speed; means for feeding fuel to the carburetor under pressure while supercharging and means for equalizing the pressure in the carburetor float chamber with the supercharging pressure.

32. In an internal combustion engine, a working chamber; a low speed intake valve; a high speed intake valve; a carburetor; a duct connecting the carburetor with the low speed valve; a second duct connecting the carburetor with the high speed valve; a supercharger; means for automatically admitting fuel vapors to the working chamber at low engine speeds through the low speed valve and duct, and for automatically admitting fuel vapors to the working chamber through both the low and high speed valves and ducts at intermediate engine speeds; means for automatically progressively supercharging the fuel vapors passing through said ducts at high engine speed; means for feeding fuel to the carburetor under pressure proportionate to the supercharging pressure; and means for equalizing the pressure in the carburetor float chamber with the supercharging pressure.

33. In an internal combustion engine, a working chamber; a low speed intake valve; a high speed intake valve; a carburetor; a duct connecting the carburetor with the low speed valve; a second duct connecting the carburetor with the high speed valve; a supercharger; means for admitting heated fuel vapors to the working chamber at low engine speeds through the low speed valve and duct, and for admitting heated fuel vapors to the working chamber through both the low and high speed valves and ducts at intermediate engine speeds; and means for supercharging the fuel vapors with compressed air at normal temperature at high engine speed.

34. In an internal combustion engine, a working chamber; a low speed intake valve; a high speed intake valve; a carburetor; a duct connecting the carburetor with the low speed valve; a second duct connecting the carburetor with the high speed valve; a supercharger; means for admitting heated fuel vapors to the working chamber at low engine speeds through the low speed valve and duct, and for admitting heated fuel vapors to the working chamber through both the low and high speed valves and ducts at intermediate engine speeds; means for supercharging the fuel vapors with compressed air at normal temperature at high engine speed; and means for feeding fuel to the carburetor under pressure while supercharging.

35. In an internal combustion engine, a working chamber; a low speed intake valve; a high speed intake valve; a carburetor; a duct connecting the carburetor with the low speed valve; a second duct connecting the carburetor with the high speed valve; a supercharger; means for admitting heated fuel vapors to the working chamber at low engine speeds through the low speed valve and duct, and for automatically admitting heated fuel vapors to the working chamber through both the low and high speed valves and ducts at intermediate engine speeds; means for automatically supercharging the fuel vapors with compressed air at normal temperature at high engine speed; and means for maintaining the pressure of the fuel supply to the carburetor proportionate to the supercharging pressures.

36. In an internal combustion engine, a working chamber; a low speed intake valve; a high speed intake valve; a carburetor; a duct connecting the carburetor with the low speed valve; a second duct connecting the carburetor with the high speed valve; a supercharger; means for automatically admitting heated fuel vapors to the working chamber at low engine speeds through the low speed valve and duct, and for automatically admitting heated fuel vapors to the working chamber through both the low and high speed valves and ducts at intermediate engine speeds; means for automatically progressively supercharging the fuel vapors with compressed air at normal temperature at high engine speed; means for feeding fuel to the carburetor under pressure while supercharging; and means for equalizing the pressure in the carburetor float chamber with the supercharging pressure.

37. In an internal combustion engine, a working chamber; a low speed intake valve; a high speed intake valve; a carburetor; a duct connecting the carburetor with the low speed valve; a second duct connecting the carburetor with the high speed valve; a supercharger; means for automatically admitting heated fuel vapors to the working chamber at low engine speeds through the low speed valve and duct, and for automatically admitting heated fuel vapors to the working chamber through both the low and high speed valves and ducts simultaneously at intermediate engine speeds; means for automatically progressively supercharging the fuel vapors with compressed air at normal temperature at high engine speed; means for feeding fuel to the carburetor under pressure proportionate to the supercharging pressure; and means for equalizing the pressure in opposite sides of the carburetor float chamber during supercharging.

In testimony that I claim the foregoing as my own I affix my signature.

HENRY LOWE BROWNBACK.